(12) United States Patent
Wright et al.

(10) Patent No.: US 10,139,944 B2
(45) Date of Patent: Nov. 27, 2018

(54) STAND ALONE INPUT DEVICE

(71) Applicant: Apple Inc., Cupertino, CA (US)

(72) Inventors: James E. Wright, San Jose, CA (US); Peteris K. Augenbergs, San Francisco, CA (US); Jerzy S. Guterman, Sunnyvale, CA (US); William J. Schmidt, Cupertino, CA (US); Jack B. Rector, III, San Ramon, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/258,951

(22) Filed: Sep. 7, 2016

(65) Prior Publication Data

US 2017/0068373 A1 Mar. 9, 2017

Related U.S. Application Data

(60) Provisional application No. 62/215,655, filed on Sep. 8, 2015.

(51) Int. Cl.
| | |
|---|---|
| *G06F 3/041* | (2006.01) |
| *G06F 3/01* | (2006.01) |
| *G06F 3/0354* | (2013.01) |

(52) U.S. Cl.
CPC ............ *G06F 3/0414* (2013.01); *G06F 3/016* (2013.01); *G06F 3/03547* (2013.01); *G06F 2203/04107* (2013.01); *G06F 2203/04809* (2013.01)

(58) Field of Classification Search
CPC ......... G06F 3/016; G06F 3/0414; G06F 3/041
See application file for complete search history.

(56) References Cited

U.S. PATENT DOCUMENTS 6,195,085 B1 * 2/2001 Becker ................ G06F 3/03543
248/918
8,866,641 B2 10/2014 Caine et al.
(Continued)

FOREIGN PATENT DOCUMENTS

| CN | 100477051 C | 4/2009 |
|---|---|---|
| CN | 101868773 A | 10/2010 |

(Continued)

OTHER PUBLICATIONS

PCT Search Report and Written Opinion; PCT/US2016/050174 dated Dec. 12, 2016.
(Continued)

*Primary Examiner* — Towfiq Elahi
(74) *Attorney, Agent, or Firm* — Dickinson Wright RLLP

(57) ABSTRACT

A stand alone input device can be a touch pad that provides touch inputs to an associated computing device. The input device can include a wedge-shaped base defining an inner cavity, a touch plate having a touch surface disposed over the inner cavity and configured to accept a touch input, cantilevered beams coupled to the wedge-shaped base and the touch plate and configured to deliver a force from the touch input, a haptic generator coupled to the cantilevered beams and configured to generate a haptic output in response to the touch input, an antenna component integrated within a wall of the wedge-shaped base and an antenna resonance cavity located within the inner cavity, and a switch assembly including a sliding component having a pin through a wedge-shaped base wall and a switch beam having a protrusion that engages multiple recesses located at a detent region on the sliding component.

18 Claims, 5 Drawing Sheets

(56) References Cited

U.S. PATENT DOCUMENTS

| | | |
|---|---|---|
| 9,013,405 B2 | 4/2015 | Kujawski et al. |
| 9,177,733 B2 | 11/2015 | Krumpelman et al. |
| 2002/0152934 A1 | 10/2002 | Haney |
| 2003/0184574 A1* | 10/2003 | Phillips ............... G06F 3/016 715/702 |
| 2003/0213822 A1 | 11/2003 | Lautner |
| 2006/0236263 A1* | 10/2006 | Bathiche ............ G06F 3/016 715/786 |
| 2007/0164995 A1 | 7/2007 | Pascucci |
| 2008/0316171 A1* | 12/2008 | Shahoian ............ G06F 3/016 345/158 |
| 2008/0316180 A1 | 12/2008 | Carmody et al. |
| 2009/0167704 A1 | 7/2009 | Terlizzi et al. |
| 2011/0310029 A1* | 12/2011 | Uttermann ........ G06F 3/03547 345/173 |
| 2012/0007806 A1* | 1/2012 | Liu .................. G06F 3/0317 345/166 |
| 2012/0019445 A1 | 1/2012 | Liu |
| 2012/0042735 A1* | 2/2012 | Mei .................. G06F 3/0338 73/862.636 |
| 2013/0169424 A1* | 7/2013 | Kujawski ........... G06F 3/03543 340/407.2 |
| 2014/0018173 A1 | 1/2014 | Urhman |
| 2014/0225832 A1* | 8/2014 | Wright ............... G06F 3/03543 345/163 |
| 2014/0246551 A1 | 9/2014 | Springer et al. |
| 2014/0293536 A1 | 10/2014 | Bramah et al. |

FOREIGN PATENT DOCUMENTS

| | | |
|---|---|---|
| CN | 102339133 A | 2/2012 |
| CN | 103168280 A | 6/2013 |
| CN | 104508605 A | 4/2015 |
| CN | 104769528 A | 7/2015 |
| CN | 104024989 B | 3/2017 |
| EP | 2384466 B1 | 11/2015 |
| WO | 2012054127 A1 | 4/2012 |
| WO | 2014009933 A1 | 1/2014 |

OTHER PUBLICATIONS

Chinese Patent Application for Utility Model No. ZL201621127683.8—Evaluation Report dated Aug. 22, 2017.
Chinese Application for Utility Model No. 201621127683.8—First Rectification Notification dated Mar. 29, 2017.
Chinese Application for Utility Model No. 201610901808.6—First Office Action dated Oct. 8, 2018.

* cited by examiner

STAND ALONE INPUT DEVICE

CROSS-REFERENCE TO RELATED APPLICATION

This application claims the benefit of U.S. Provisional Patent Application No. 62/215,655, filed on Sep. 8, 2015, which is incorporated by reference herein in its entirety for all purposes.

FIELD

The described embodiments relate to consumer electronic devices. More particularly, the described embodiments relate to methods and apparatuses suitable for receiving a tactile user input for control of a computing device.

BACKGROUND

Most consumer electronic devices include a touch-based interface of some type, such as a keyboard, a touch screen, moveable buttons or the like. For touch-based interfaces with moveable components, a user's experience can be affected by feedback generated during actuation of the moveable component, such as a resistance to movement, a smoothness of the movement and a range of movement. Typically, users find certain combinations of touch-based feedback more pleasing to the touch than other combinations. In addition, from a visual standpoint, users often find compact and sleek designs more aesthetically appealing. Sleek and compact designs that are visually appealing tend to have compact enclosures that leave little room for a wide range of movement associated with touch-based interface components.

SUMMARY

A stand alone input device can be a touch pad that provides touch inputs to an associated host computing device. The stand alone input device can include a wedge-shaped base defining an inner cavity, a touch plate coupled to the wedge-shaped base and having a touch surface disposed over the inner cavity, and multiple cantilevered beams coupled to the wedge-shaped base and the touch plate. The wedge-shape base can be configured to rest on an exterior supporting surface such that the touch surface is presented at an angle with respect to the exterior supporting surface. The touch plate can be configured to accept a touch input for the associated host computing device. The cantilevered beams can be configured to deliver a force from the touch input to sensors within the wedge-shaped base.

The stand alone input device can also include a haptic generator coupled to the cantilevered beams and configured to generate a haptic output in response to the touch input, an antenna component integrated within a wall of the wedge-shaped base and configured to communicate with the associated host computing device, an antenna resonance cavity located within the inner cavity, and a switch assembly including a sliding component having a pin that extends through as wall in the wedge-shaped base. The switch assembly can also include a switch beam having a protrusion that engages multiple recesses located at a detent region on the sliding component.

Other aspects and advantages will become apparent from the following detailed description taken in conjunction with the accompanying drawings which illustrate, by way of example, the principles of the invention.

BRIEF DESCRIPTION OF THE DRAWINGS

The described embodiments will be readily understood by the following detailed description in conjunction with the accompanying drawings, wherein like reference numerals designate like structural elements, and in which.

DETAILED DESCRIPTION OF THE DESCRIBED EMBODIMENTS

Figure 1:
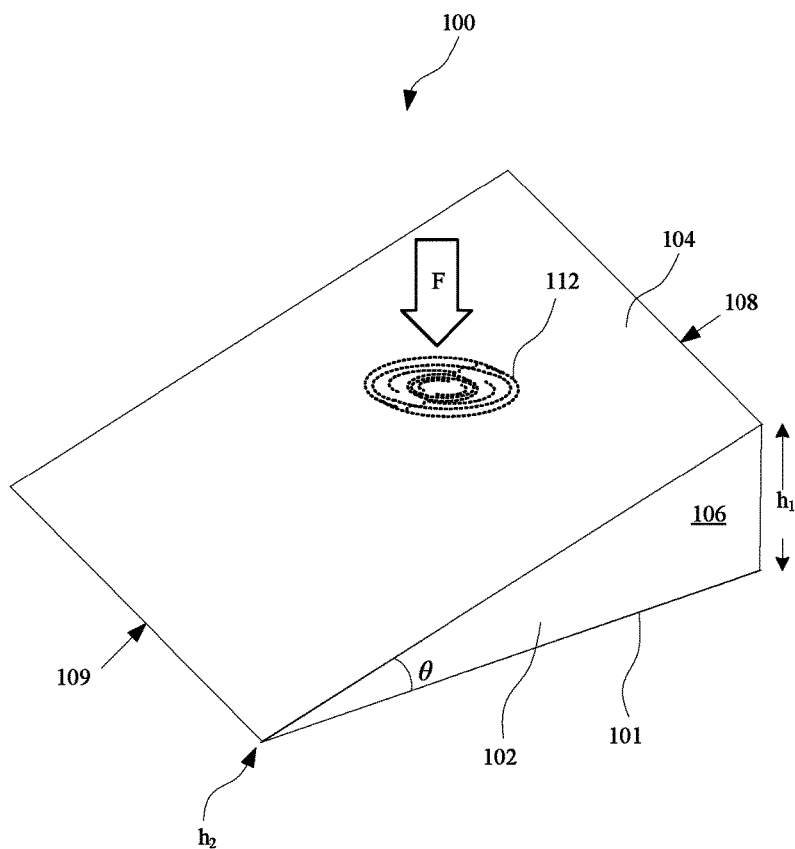
FIG. 1 shows a view of a stand alone input device in accordance with the described embodiments.

In the following detailed description, numerous specific details are set forth to provide a thorough understanding of the concepts underlying the described embodiments. It will be apparent, however, to one skilled in the art that the described embodiments can be practiced without some or all of these specific details. In other instances, well known process steps have not been described in detail in order to avoid unnecessarily obscuring the underlying concepts.

Broadly speaking, the embodiments disclosed herein relate to a stand alone input device well suited for use with computing devices. In particular, the stand alone input device can receive tactile input from a user and provide a haptic feedback that gives the user a physical sensation beyond that experienced using a conventional input device. In one embodiment, the stand alone input device can have an overall wedge shape and have a touch sensitive surface exposed to a user at an angle. The overall wedge shape can enhance an aesthetic appeal of the stand alone input device as well as provide a more comfortable user experience. For example, when the stand alone input device takes the form of a touch pad having a touch surface set at an incline with respect to a horizontal support surface, the touch surface can be more easily seen and accessed by the user. The stand alone input device can communicate with a host device using a wireless communication and/or wired communication channel. The host device can include any computing device that can be controlled by signals provided by the stand alone input device. For example, the host device can take the form of a desktop computer, laptop computer, tablet device and so on.

For the remainder of this discussion and without loss of generality, the stand alone input device is discussed in terms of a track pad arranged to receive user provided touch events that can be interpreted by the host device as control signals.

The touch event can include, for example, a finger gesture from more than one finger applied in unison. The gesture can also include a single finger touch event such as a swipe or a tap. The track pad can be used to provide the control signals to the host device over a communication channel. The communication channel can be wired or wireless. Accordingly, the track pad can be formed at least in relevant part of material such as plastic or ceramic that is radio frequency (RF) transparent. In this way, the passage of RF transmissions are not hindered or blocked.

The touch pad can be wedge shaped by which it is meant that a touch surface is inclined at an angle with respect to a support surface upon which the touch pad rests. In this way, the wedge shape provides both an aesthetic appeal as well as improves user access. The track pad can include a housing having side walls that can be shaped such that a rear facing wall has a greater height than an opposing front facing wall. For example, the sidewalls can have a triangular shape that tapers from a first height at a rear portion of the track pad to a reduced second height at a front portion of the track pad. A touch sensitive touch surface can be formed of transparent material and have a textured exterior surface and an interior surface overlaid with an opaque layer that can be seen through the transparent touch surface. The opaque layer can be formed of a material (such as ink) having a color or other surface feature that can be viewed through the transparent material of the touch surface. In order to promote wireless communication, the track pad includes a rear wall having an exterior opening covered by a cosmetic RF transparent layer and an interior opening having a size and shape in accordance with transmission of RF energy in a frequency range used for wireless communication with the host device.

The housing can be formed of a strong and durable yet lightweight material. Such materials can include composite materials and or metals such as aluminum. Aluminum has a number of characteristics that make it a good choice for the multipart housing. For example, aluminum is a good electrical conductor that can provide good electrical ground and it can be easily machined and has well known metallurgical characteristics. Furthermore, aluminum is not highly reactive and non-magnetic which can be an essential requirement if the portable computing system has RF capabilities, such as WiFi, BlueTooth, etc. In order to both protect the housing and provide an aesthetically appealing finish (both visual and tactile), a protective layer can be placed or formed on an external surface of the housing. The protective layer can be applied in such a way to both enhance the aesthetic appeal of the housing and to protect the appearance of the portable computing system. In one embodiment, when the multipart housing is formed of aluminum, at least an exterior surface of the aluminum can be anodized to form the protective layer.

In order to provide a pleasing aesthetic to the user, the shape of the portable touch pad can have a profile that is pleasing to the eye and to the touch. In the described embodiments, the housing can have a wedge shape. The wedge shape can be such that when the bottom surface of the portable touch pad is placed upon a flat supporting surface, such as a table or desk, the angle presented by the wedge shaped housing can present an easy to use touchpad. The wedge shape can improve user interaction with the touch pad by presenting the touch pad surface in a more natural alignment with a user's fingers. In this way, improved ergonomics can help reduce an amount of stress and strain placed upon the user's wrists.

The housing can have edges that define an opening and a trim portion that surrounds the opening. In one embodiment, the trim portion can be part of a touch stack defined as components that can be in motion in accordance with a force applied at the touch surface. In this way, when a force is applied to the touch surface, the touch stack and associated components can respond by moving towards an interior of the housing until contact with the trim portion or other part of the touch stack that acts as hard stop.

In the described embodiment, internal operational components can be mounted and supported by the housing providing an integrated structure. Accordingly, the housing can have integrally formed support beams having an angular displacement with regards to the housing. In other words, the support beams can be formed at an angle other than ninety degrees with respect to the housing and as such can provide a support structure that allows securing assemblies (such as bosses and associated fasteners) to be placed with respect to the tapered structure of the housing so as to afford a greater amount of thread engagement. For example, a boss can be placed under the support beams using a swaging technique that expands the boss and facilitates securing a threaded fastener into the boss in a region that would be less accessible. In this way, the threaded fastener can be locked into place using the swaged connectors thereby locking the location relative to an attraction plate used in combination with a haptic engine to provide a user with an illusion of motion in a Z (vertical) direction. In one embodiment, a printed circuit board (PCB) can include plated openings (also referred to as vias) that allow air/oxygen to transfer to an ink layer disposed on an interior surface of the touch surface. This is particular important when the ink layer is formed of white/whitish ink as this can prevent discoloration of the ink layer due to well known chemical reactions. An ESD shield can be formed of conductive foam that can direct electrical energy in the form of an electrical discharge along a conduction path behind a battery. Moreover, an integrated switch system can be used by a user to switch a current operating state (ON, OFF, STBY) of the touch pad. A wireless antenna system can be integrated into the housing.

These and other embodiments are discussed below with reference FIGS. 1-6.

FIG. 1 shows a side perspective view of a stand alone input device in accordance with the described embodiments. Stand alone touch pad 100 can include a base 102 having a tapered, or wedge shaped, cross section that is configured to rest at a bottom surface or edge 101 on an exterior supporting surface, as well as a touch surface 104 arranged to detect a tactile, or touch, event. Base 102 can have sidewalls 106 having a tapered appearance. More particularly, in the embodiment shown, two sidewalls 106 take on a triangular shape such that side wall 106 has a height $h_1$ at rear portion 108 that reduces to height $h_2$ at front portion 109. In this way, touch surface 104 is presented to a user at angle θ with respect to the exterior supporting surface. In the described embodiment, touch surface 104 can include or couple to sensors capable of detecting a touch event initiated by a user. In order to provide an enhanced user experience, touch pad 100 can include haptic actuators (not shown) that can respond to a touch event by generating haptic response 112. In some cases, in addition to a haptic response, touch pad 100 can detect a magnitude of force F applied at touch surface 104. The magnitude of force F can, in turn, be used as a control signal that can be used by a host device (not shown) in communication with touch pad 100. Touch surface 104 can be formed of transparent material and have a textured exterior surface and an interior surface coated with a layer of material that can be used to enhance an aesthetic appeal of touch surface 104. For example, the interior surface of touch surface 104 can be overlaid with a layer of ink having a color or surface feature viewable through the transparent material that forms touch surface 104.

Figure 2:
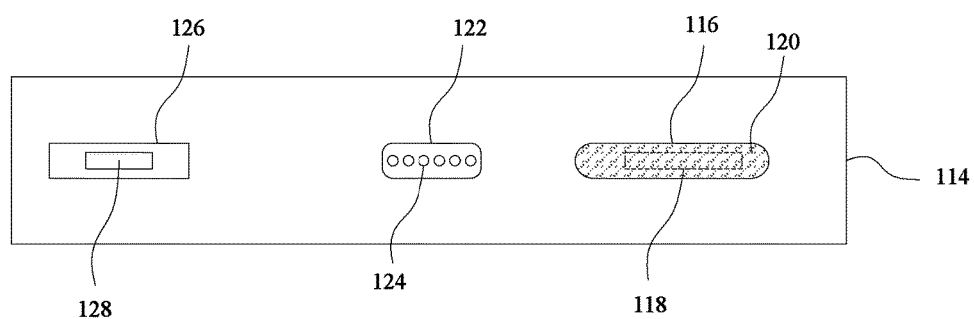
FIG. 2 shows a view of a rear wall of the stand alone input device of FIG. 1 in accordance with the described embodiments.

FIG. 2 shows a view of a rear wall of the stand alone input device of FIG. 1 in accordance with the described embodiments. Rear wall 114 can be located at the rear portion 108 of touch pad 100. Rear wall 114 can include opening 116 that can include an integrated antenna 118, each of which can be covered by cosmetic overlay 120 that can be used to provide an appearance of continuity to rear wall 114. Opening 116 can have a size and shape in that allows passage of RF energy in a frequency range that comports with a wireless communication protocol used by touch pad 100 to communicate with a host device. This is particularly important when base 102 and rear wall 114 are formed of RF opaque material such as metal along the lines of aluminum, stainless steel, etc. Rear wall 114 can also include opening 122 having a size and shape that can accommodate connector assembly 124. Opening 126 can be used to accommodate switch assembly 128 described in more detail below.

Figure 3:
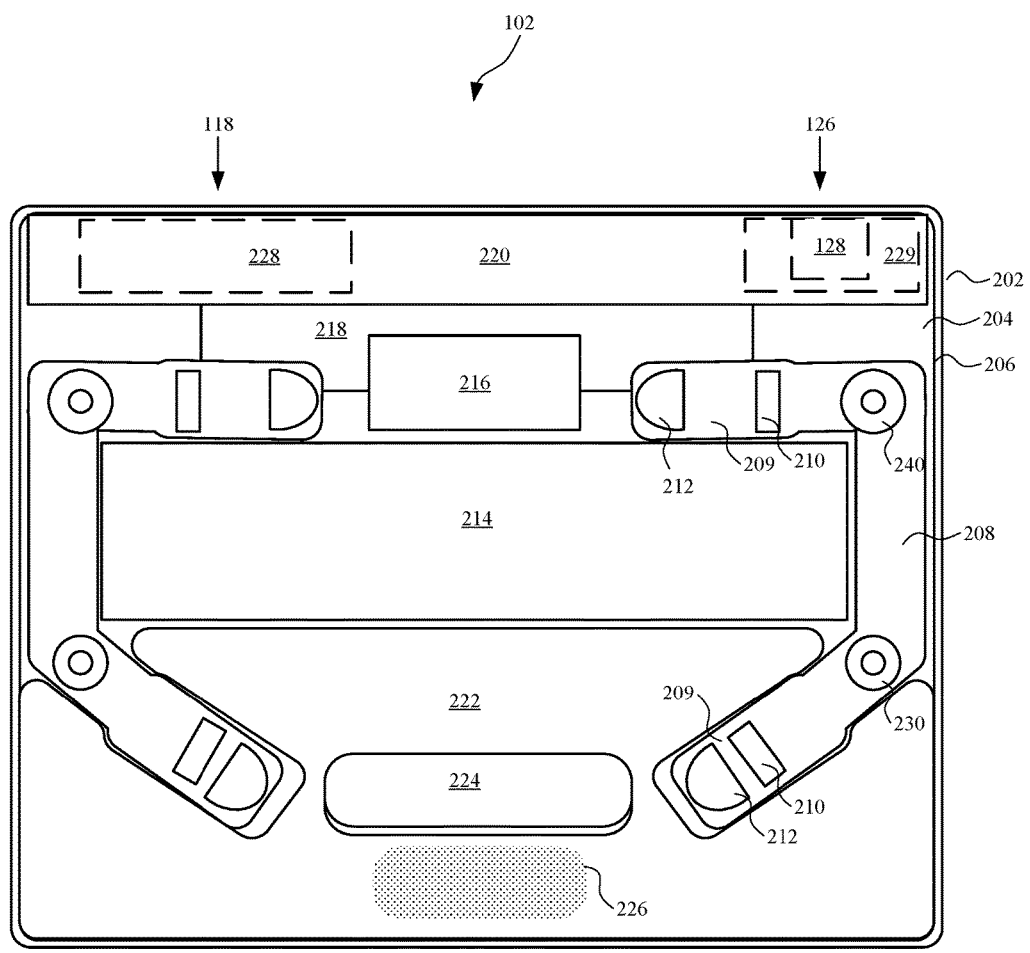
FIG. 3 shows a view of an interior of a base portion of the stand alone input device of FIG. 1 in accordance with the described embodiments.

FIG. 3 shows a view of an interior of a base portion of the stand alone input device of FIG. 1 in accordance with the described embodiments. The base portion shown includes base 102 and various components within touch pad 100, with the touch surface portion removed therefrom. Base 102 can have edges 202 that define an opening 204 and a raised trim portion 206 that surrounds and defines opening 204. In one embodiment, trim portion 206 can be part of a touch stack defined as components that can be put in motion in accordance with a force applied at the touch surface 104. More particularly, trim portion 206 can act as a stop that limits the downward movement of the touch stack. In this way, when a force is applied to touch surface 104, the touch stack can respond to by moving towards an interior of base 102 until contact with trim portion 206 or another part of the touch stack that acts as hard stop.

In various embodiments, the overall touch pad 100 is more integrated and less modular in nature, which can involve the exterior housing or enclosure holding interior components together. Many interior components are mounted to the housing or enclosure, such as with base 102. Various components at or within base 102 can include cantilevered beams 208, strain gauges 210, gel pads 212, a battery 214, a haptic engine 216, a multi-layer board (MLB) 218, a shelf 220, one or more gel plates 222 that may include a lozenge shaped embossment 224 and a stippling pattern 226, an antenna resonance cavity 228 proximate integrated antenna 118, a switch cavity 229, front boss couplings 230, rear boss couplings 240, and a switch assembly 128.

Cantilevered beams 208 can operate to couple the touch stack to the base 102, such that the touch stack can nominally reside at a resting or "up" position and can also be depressed to an actuated or "down" position. Beams 208 can be support beams that can be separate from other internal components. In some cases, the beams 208 can be integrated with the exterior housing or enclosure. The beams can have strain gauges 210 on or about them to be able to sense strain when the touch surface 104 is pressed against. The strain gauges can then facilitate activation of one or more actuators when sufficient strain is sensed.

The beams 208 can be angled as shown for several reasons. The angled nature of the beams can allow for greater length and thus cantilever leverage. Also, the angled nature of the beams provides greater interior space for a maximum battery size, as the beams extend around the battery cavity holding battery 214. Further, the angled beams allow the boss couplings 230, 240 and screws therein to shift locations to better places within the device that allow for more thread engagement.

The haptic engine 216 can include an actuator that can be an electromagnetic coil wound motor that pulls on or shakes a steel component to move or vibrate it a small amount, such as about 30 microns. The steel component can be coupled to one or more gel based components or pads 212 that dampen the vibrations but also pass some of the movement along to the beams 208 and then to the touch surface 104, where a haptic feedback is experienced by the user. Gels can be a silicone based gel that facilitates a suitable transfer of movement or vibration between components.

When pushed against by a user, a typical touch pad or track pad will physically depress up and down. Touch pad 100 instead shakes or vibrates a small amount and in horizontal directions at a rate that can feel like an up and down movement of the touch surface is being experienced. Strain gauges 210 sense force so as to determine how hard the user is pushing on the touch surface. This amount of force can then be used as an input to the associated computing device. This can include an actual measured and communicated analog amount, such as in a force feedback embodiment, and/or can include discrete or incremental amounts, such as a light click and a deep click.

Gel can be contained within gel pads 212 that can be molded or otherwise coupled to gel plates 222, which in turn can be glued or otherwise coupled to the beams 208. An attraction plate (not shown) can be glued or otherwise coupled to one or more of the gels or gel plates. Beams 208 deflect like springs when actuated, and are dimensioned and angled to allow for a greater central cavity and space, which is filled by the battery 214, while still facilitating a similar performance regardless of where the touch surface 104 is depressed. Force flexures 209 can be integrally formed with the beams 208 at the ends of the beams to form the cantilever in some embodiments, as shown. Alternatively, force flexures 209 can be separate components that are beneath the beams 208 and cantilever out to form part of the touch stack, which allows a touch at the touch surface 104 to be sensed by the device. Gel pads 212 are at the ends of the force flexures. Gel shear stiffness can be selected to transfer and dampen movement and vibration at a preferable magnitude and rate.

A shelf 220 can be integrated into the housing at the back end of the base 102. Below the shelf and proximate the antenna window can be an antenna resonance chamber 228 that can limit interference or noise from the MLB 218 and other electrical components. The antenna chamber 228 can include a feed point and a receiving point for RF communications. A through slot 116 in the housing is dimensioned to be tuned for RF communications.

A front gel plate 222 carries the gels 212 and adds stiffness to the touch stack. The gel pads 212 are overmolded to the gel plate 222. A lozenge shape embossment 224 can be added to the front gel plate 222 to provide additional stiffness. A stippling pattern 226 can be added to one or both gel plates 222 to relieve surface stresses that may arise due to non-flatness of the gel plate, particularly about the embossment 224. While stippling pattern 226 is shown as covering a small area between the embossment 224 and the lower edge of gel plate 222, it will be understood that such a stippling pattern can be located elsewhere, may be larger, or both. For example, stippling pattern 226 could instead be located atop the embossment 224. Alternatively, the entire gel plate 222 can be covered with a stippling pattern. This may or may not include the top of the embossment 224 as well. Other locations and sizes are also possible.

An ESD shield comprising pads and conductive foams creates a conduction path behind the battery 214 to shield the battery. The foams couple to pads along the circumference of a polyimide shield that protects the battery 214. The pads couple various conductive components, which can include the outer housing, which can be aluminum or another conductive component.

Figure 4A:
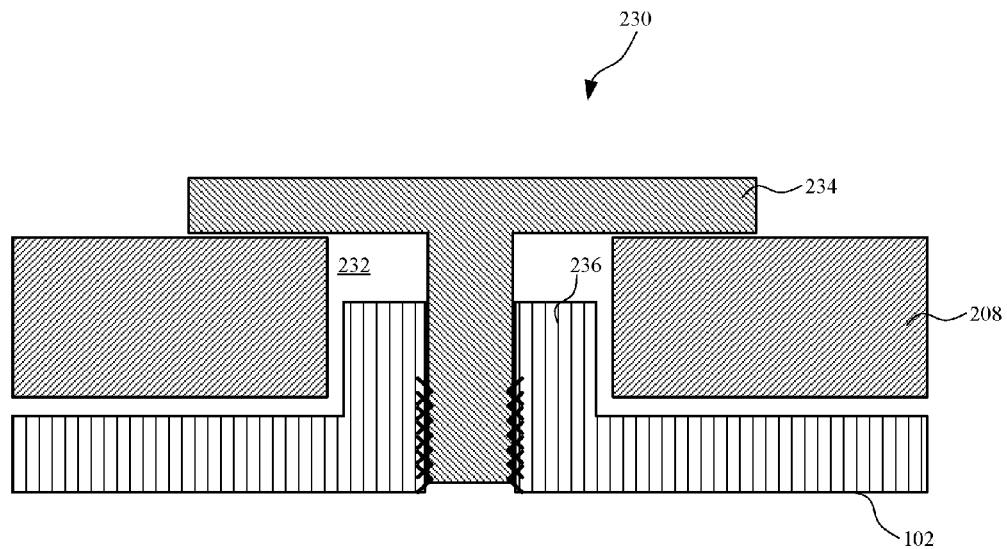
FIG. 4A shows a view of a front boss coupling for the stand alone input device of FIG. 1 in accordance with the described embodiments.

FIG. 4A shows a view of a front boss coupling for the stand alone input device of FIG. 1 in accordance with the described embodiments. Front boss coupling 230 fastens a front portion of each beam 208 to the base 102 using an opening 232 through the beam. A screw 234 above the beam enters the beam opening 232 from the top and threads into a threaded boss 236 under the beam that enters the opening part way from the bottom. The threaded boss 236 can be integrally formed in the base 102 or housing.

Figure 4B:
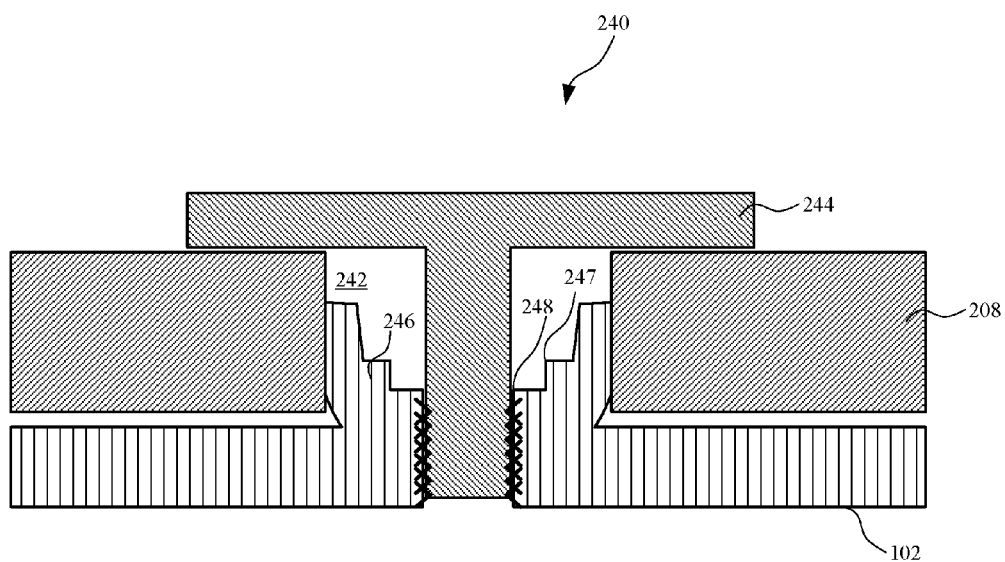
FIG. 4B shows a view of a rear boss coupling for the stand alone input device of FIG. 1 in accordance with the described embodiments.

FIG. 4B shows a view of a rear boss coupling for the stand alone input device of FIG. 1 in accordance with the described embodiments. Rear boss coupling 240 fastens a rear portion of each beam 208 to the base 102 or housing using an opening 242 through the beam. The beam 208 is set onto a threaded boss 246, which again can be integrally formed in the base or housing, and again can extend into the beam opening 242 from the bottom. A conical swaging tool can then be used to enter the beam opening 242 from the top and engage with the threaded boss 246. In various embodiments, the threaded boss can have an upper portion 247 with a larger diameter opening that is not threaded and a lower portion 248 with a smaller diameter opening that is threaded. The conical swaging tool can enter the upper portion 247 with a larger diameter and forcibly push out the walls of the upper portion until they deform and mash or press fit into the walls of the beam 208 within the beam opening 242. The conical swaging tool can then be removed, and a screw 244 can then be inserted into the beam opening 242 from above to engage with the lower threaded portion 248 of the boss 246, which lower portion does not deform during the swaging process.

A similar swaging process can be used to deform boss material into openings within other device components as may be desired. Such a swaging process may or may not include a screw and threaded portion of the boss. Such other components to be fastened to the base or outer housing in this manner can include the actuator, for example. By swaging the upper walls of the boss into the sidewalls of the beam opening, a more solid and firm coupling between the housing and the beam, such that these components do not move or shift with respect to each other in a manner that might occur in slight amounts using ordinary screw or fastening approaches.

Figure 5:
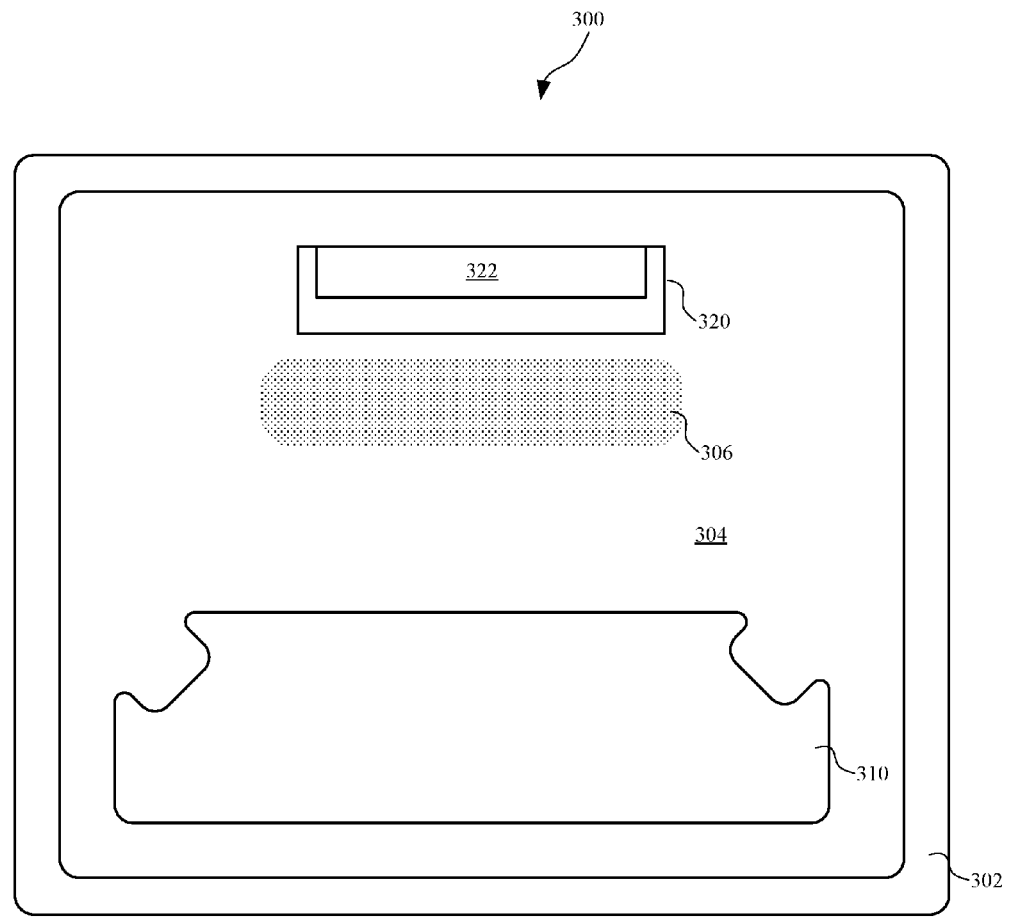
FIG. 5 shows a view of an interior of a touch plate of the stand alone input device of FIG. 1 in accordance with the described embodiments.

FIG. 5 shows a view of an interior of a touch plate of the stand alone input device of FIG. 1 in accordance with the described embodiments. Touch plate 300 can have touch surface 104 on its exterior, and can be a transparent or translucent glass that is backed by an ink, which can be white, or any other color. Touch plate 300 can have a trim portion 302 around the perimeter that can function as a hard stop. Trim portion 302 can be aesthetically pleasing as it is visible to the outside and also covers or hides the touch PCB 304 located within the touch plate 300. Inside of trim portion 302 is the touch PCB 304, which can abut and be aligned edge to edge with the trim portion 302. Touch PCB 304 can have through plated vias 306 to allow air to pass through the touch PCB 304 to keep the white ink thereupon from turning blue.

Gel plates 222 can adhere to the interior surface of the touch plate 300 at appropriate locations. Strain gauges can adhere to flexures within the base 102, and clearance can be given for this arrangement due to the shape cutouts 310 along the interior of the touch plate 300. Attraction plate 320 can be bonded to the interior surface of the touch plate 300 at a suitable location. The attraction plate 320 can be L-shaped with an extended portion 322 that extends into a space proximate the haptic engine 216 located within the base portion 102. The whole track pad 100 can shake slightly when actuated by a user. It can feel like a vertical or Z-directional motion, even though the actual movement or vibration is in a horizontal or X-Y direction. This can be caused by the haptic engine 216 moving or vibrating, which movements or vibrations can be sent through the attraction plate 320 to the touch surface 104, and/or through the gel pads 212 to the beams 208 to the touch surface 104.

Figure 6:
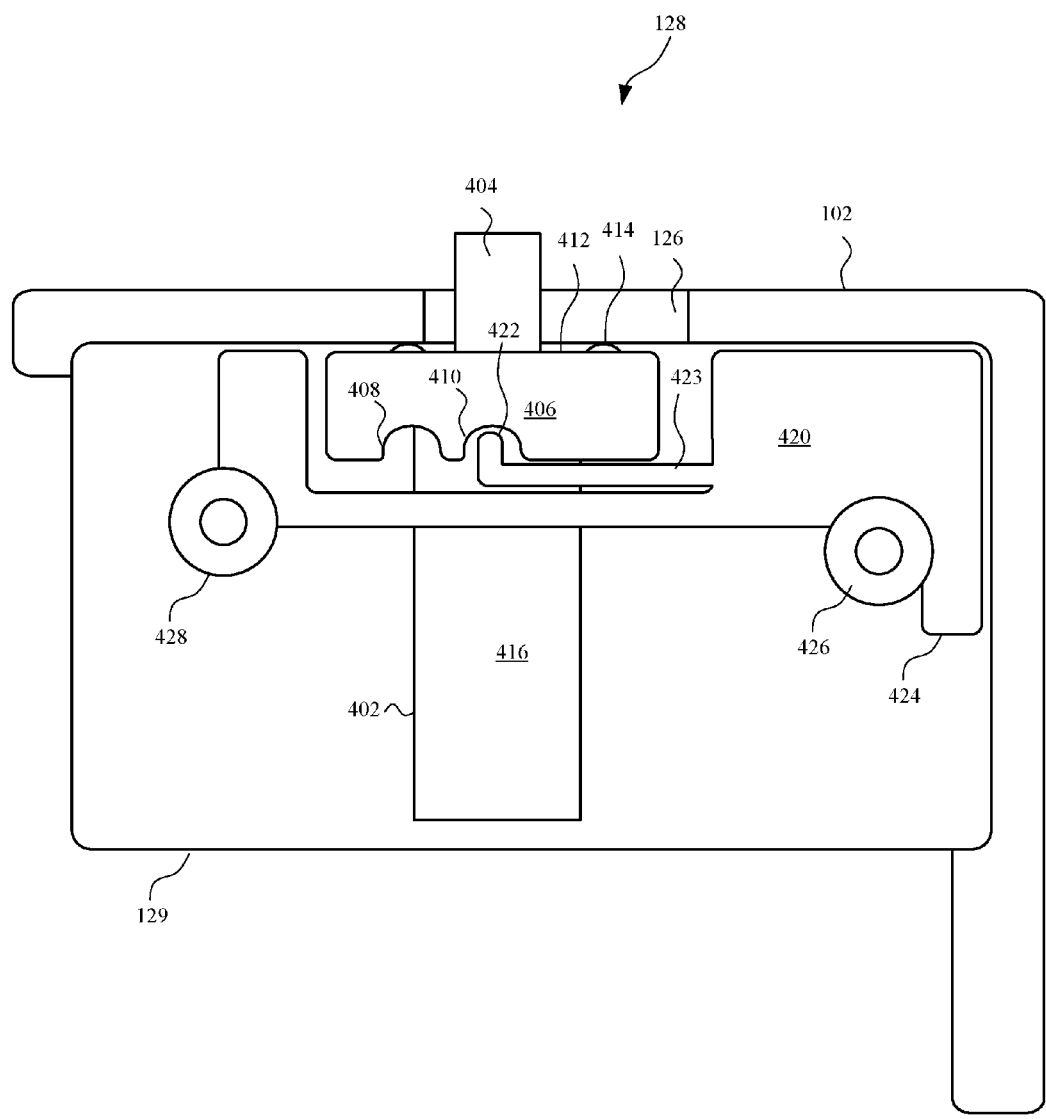
FIG. 6 shows a view of an overall switch assembly of the stand alone input device of FIG. 1 in accordance with the described embodiments.

FIG. 6 shows a view of an overall switch assembly of the stand alone input device of FIG. 1 in accordance with the described embodiments. Switch assembly 128 can be positioned proximate opening 126 in the rear wall 114 of base 102. An integrated switch mechanism can include a sliding component 402 having a pin 404 or other part that slides back and forth within the slot or opening 126 in the housing. The sliding component 402 can be located within a pocket or cavity 129 within the housing or base 102, and can include the pin 404 and also an integrated detent region 406 that may be integrally formed on a flange of the sliding component. Detent region 406 can include multiple recesses 408, 410 on its backside, which can correspond to different positions of the sliding switch. Sliding component 402 can also have a sliding surface 412 and one or more nubs or protrusions 414 that function to minimize friction with the interior surface 103 of the housing. A rear portion 416 of sliding component 402 can serve to provide overall mass and stability.

A switch beam 420 can be arranged to bias the sliding component 402 against the housing, and also to engage with the recesses 408, 410 at detent region 406. Switch beam 420 can include an engagement feature or protrusion 422 adapted to engage with recesses 408, 410 as the sliding component 402 slides between different positions. Engagement feature 422 can be located at the end of a flexure arm 423 that is integrally formed with and extends away from another region of the switch beam 420. Flexure arm 423 can move up and down as may be needed in order for the engagement feature 422 to move up and down to engage with and leave the recesses 408, 410. Such engagement may result in a positive "click," snap, or other noticeable feedback as the engagement feature moves from one recess to the other. Alternatively designed flexure arms or other arrangements are also possible to allow for slight movement of the engagement feature 422 to facilitate shifting between the recesses 408, 410. Other than the engagement feature 422 and flexure arm 423, the remainder of switch beam 420 can remain stationary with respect to the device housing, such as by way of another integrated feature or protrusion 424 that locks the switch beam position in place against the housing by way of a through boss 426. A separate through boss, screw, or other fastener 428 can function both to hold the switch beam 420 in place against the housing and also limit the motion of the sliding component 402.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A stand alone input device, comprising:
   a base defining an inner cavity that includes a bottom surface configured to rest on a supporting surface;
   a touch stack comprising:
      a touch plate having an exterior surface and an interior surface,
      a trim portion surrounding a perimeter of the touch plate, and
      an attraction plate bonded to the interior surface of the touch plate and including an extended portion configured to extend into the inner cavity proximate a haptic engine included in the inner cavity of the base; and
   a pair of cantilever beams positioned within the inner cavity that operate to couple the touch stack to the base,
   wherein the touch plate is inclined at an angle with respect to the bottom surface of the base and is capable of moving toward the bottom surface in response to a force applied thereto.

2. The stand alone input device of claim 1, wherein at least a portion of the touch plate is transparent or translucent, and wherein the exterior surface of the touch plate is textured and the interior surface of the touch plate is covered by an ink.

3. The stand alone input device of claim 2, wherein the touch stack further comprises a printed circuit board that includes a plurality of through plated vias that facilitate circulation of air to access the ink.

4. The stand alone input device of claim 1, wherein each cantilever beam in the pair of cantilever beams includes one or more strain gauges affixed thereto to measure a magnitude of the force.

5. The stand alone input device of claim 4, wherein at least one gel pad is disposed between the touch stack and each cantilever beam in the pair of cantilever beams.

6. The stand alone input device of claim 1, wherein the haptic engine generates a haptic response that causes horizontal motion of the touch stack in response to the force.

7. The stand alone input device of claim 6, wherein the attraction plate is in contact with the haptic engine.

8. The stand alone input device of claim 6, wherein the trim portion of the touch stack functions as a motion limiting hard stop.

9. The stand alone input device of claim 1, wherein the base includes, for each cantilever beam in the pair of cantilever beams, a rear boss coupling that is integrally formed from the base and includes a lower portion with a threaded hole of a first diameter and an upper portion with a through hole of a second diameter, wherein the upper portion of the rear boss coupling is deformed against a surface of a rear through hole in the cantilever beam using a swaging tool.

10. The stand alone input device of claim 9, wherein a fastener couples each cantilever beam to the base by threading into the threaded hole in the lower portion of the rear boss coupling.

11. An electronic input device, comprising:
   a base that defines an inner cavity;
   a touch stack disposed over the inner cavity and extending to outer edges of the base, the touch stack enclosing the inner cavity and including:
      a touch plate having an exterior touch surface being inclined at an angle with respect to a bottom surface of the base,
      a trim portion surrounding a perimeter of the touch plate, and
      an attraction plate bonded to an interior surface of the touch plate and extending into the inner cavity;
   at least one cantilevered beam positioned within the inner cavity that operates to couple the touch stack to the base via one or more gel pads disposed between the at least one cantilevered beam and the touch stack; and
   one or more strain gauges positioned on the at least one cantilevered beam to detect a magnitude of a force applied to the exterior touch surface of the touch stack,
   wherein the touch stack is capable of moving toward the bottom surface of the base in response to the force applied thereto.

12. The electronic input device of claim 11, wherein the electronic input device is wireless.

13. The electronic input device of claim 12, wherein the base includes a rear wall having an opening, the electronic input device further comprising an integrated antenna disposed in the opening, and wherein a cosmetic overlay covers the opening.

14. The electronic input device of claim 11, wherein each cantilevered beam in the at least one cantilevered beam is coupled to the base by:
   a first fastener that passes through a front opening and threads into a front boss coupling; and
   a second fastener that passes through a rear opening and threads into a rear boss coupling that includes a upper portion with a first diameter opening and a lower portion with a second diameter opening, the second diameter opening smaller than the first diameter opening and threaded to accept the second fastener,
   wherein the upper portion of the rear boss coupling is deformed using a swaging tool to form a press fit with the rear opening of the cantilevered beam.

15. The stand alone input device of claim 1, wherein the base comprises a rear wall having an opening to accommodate a switch assembly.

16. The stand alone input device of claim 15, wherein the switch assembly includes:
   a sliding component having a pin that moves within the opening and a detent region including one or more recesses; and
   a switch beam arranged to bias the sliding component against the rear wall of the base, wherein the switch beam includes an engagement feature at an end of a flexure arm that engages with the one or more recesses.

17. The stand alone input device of claim 1, further comprising a gel plate included in the inner cavity to add stiffness to the touch stack.

18. The stand alone input device of claim 1, further comprising a battery located between the pair of cantilever beams, wherein each cantilever beam is angled to accommodate the battery within the inner cavity.

* * * * *